US008368950B2

(12) United States Patent
Hall et al.

(10) Patent No.: US 8,368,950 B2
(45) Date of Patent: Feb. 5, 2013

(54) METHOD OF PRE-PROCESSING DATA ON A HOST MACHINE FOR A HOST-BASED PRINT SYSTEM

(75) Inventors: Lyman Leonard Hall, Nampa, ID (US); Douglas Gene Keithley, Boise, ID (US); Gary D Zimmerman, Garden Valley, ID (US); David Alan Bartle, Boise, ID (US)

(73) Assignee: Marvell International Technology Ltd. (BM)

( * ) Notice: Subject to any disclaimer, the term of this patent is extended or adjusted under 35 U.S.C. 154(b) by 1412 days.

(21) Appl. No.: 10/680,018

(22) Filed: Oct. 6, 2003

(65) Prior Publication Data

US 2005/0073705 A1  Apr. 7, 2005

(51) Int. Cl.
*G06F 15/00* (2006.01)
*G06F 3/12* (2006.01)
*G06K 15/00* (2006.01)
*G06K 9/36* (2006.01)
*G06K 9/40* (2006.01)
*H04N 1/40* (2006.01)
*H04N 1/407* (2006.01)

(52) U.S. Cl. ........ 358/1.9; 358/3.21; 358/3.27; 358/2.1; 358/1.15; 358/3.01; 382/232; 382/233; 382/244; 382/254

(58) Field of Classification Search ................ 358/3.21, 358/2.1, 1.9; 345/150
See application file for complete search history.

(56) References Cited

U.S. PATENT DOCUMENTS

| | | | | |
|---|---|---|---|---|
| 5,031,053 A * | 7/1991 | Chamzas et al. | ......... | 358/426.11 |
| 5,198,898 A * | 3/1993 | Miyata | ......... | 358/500 |
| 5,202,769 A * | 4/1993 | Suzuki | ......... | 358/300 |
| 5,420,693 A | 5/1995 | Horiuchi et al. | | |
| 5,515,480 A * | 5/1996 | Frazier | ......... | 358/1.9 |
| 5,526,468 A * | 6/1996 | Kolb et al. | ......... | 358/1.2 |
| 5,553,205 A * | 9/1996 | Murray | ......... | 358/1.18 |
| 5,805,735 A | 9/1998 | Chen et al. | | |
| 5,828,361 A * | 10/1998 | Gibson | ......... | 345/600 |
| 5,850,504 A | 12/1998 | Cooper et al. | | |
| 5,898,505 A * | 4/1999 | Lin et al. | ......... | 358/3.1 |
| 5,915,079 A * | 6/1999 | Vondran et al. | ......... | 358/1.15 |
| 5,978,553 A * | 11/1999 | Ikeda | ......... | 358/1.9 |
| 5,982,508 A * | 11/1999 | Kashihara | ......... | 358/3.08 |
| 5,991,515 A * | 11/1999 | Fall et al. | ......... | 358/1.15 |
| 5,991,783 A | 11/1999 | Popa et al. | | |
| 6,043,897 A | 3/2000 | Morikawa et al. | | |
| 6,115,496 A | 9/2000 | Nguyen et al. | | |
| 6,204,933 B1 * | 3/2001 | Yoshino et al. | ......... | 358/1.9 |
| 6,369,911 B1 * | 4/2002 | Hattori | ......... | 358/1.9 |
| 6,384,930 B1 * | 5/2002 | Ando | ......... | 358/1.17 |
| 6,573,919 B2 | 6/2003 | Benear et al. | | |

(Continued)

FOREIGN PATENT DOCUMENTS

JP   03-197048   8/1991
JP   2000-108462   4/2000

(Continued)

*Primary Examiner* — Hilina S Kassa

(57) ABSTRACT

The software on the host machine examines a pixel, either alone or in relation to adjacent pixels. Based on the image data contained in the pixel or group of pixels, a multi-bit value is generated that can be used by the printing device to easily reproduce the necessary detail of the original pixel. The multi-bit value also contains print engine control parameters to handle items such as toner miser mode, toner explosion, edge roll off, etc. The multi-bit value can be generated algorithmically by using a lookup table or by some combination of these methods.

16 Claims, 4 Drawing Sheets

U.S. PATENT DOCUMENTS

| | | | |
|---|---|---|---|
| 6,590,672 B1 | 7/2003 | Grosso et al. | |
| 6,705,703 B2 | 3/2004 | Zeng et al. | |
| 6,744,929 B1 * | 6/2004 | Okada | 382/251 |
| 6,819,447 B1 | 11/2004 | Sawano | |
| 6,829,414 B2 | 12/2004 | Suda | |
| 6,856,420 B1 | 2/2005 | Pew et al. | |
| 6,856,421 B1 | 2/2005 | Amir et al. | |
| 6,859,289 B1 | 2/2005 | Walmsley | |
| 6,879,409 B2 | 4/2005 | Motamed et al. | |
| 6,891,632 B2 * | 5/2005 | Schwartz | 358/1.15 |
| 7,012,706 B1 * | 3/2006 | Hansen | 358/1.15 |
| 7,016,061 B1 * | 3/2006 | Hewitt | 358/1.15 |
| 7,072,057 B1 * | 7/2006 | Hansen | 358/1.15 |
| 7,103,833 B1 * | 9/2006 | Sano et al. | 715/206 |
| 7,111,556 B2 * | 9/2006 | Aoki et al. | 101/483 |
| 7,145,668 B2 | 12/2006 | Shishido | |
| 7,317,550 B2 * | 1/2008 | Lester et al. | 358/1.16 |
| 7,319,539 B2 * | 1/2008 | Yamamura | 358/1.15 |
| 7,447,365 B2 * | 11/2008 | Ferlitsch | 382/232 |
| 2002/0067509 A1 * | 6/2002 | Roylance | 358/2.1 |
| 2003/0151774 A1 * | 8/2003 | Washio | 358/3.13 |
| 2004/0156079 A1 * | 8/2004 | Marshall et al. | 358/3.21 |
| 2004/0239961 A1 | 12/2004 | Birnbaum | |
| 2005/0052664 A1 * | 3/2005 | Ferlitsch | 358/1.6 |
| 2005/0140992 A1 | 6/2005 | Mochizuki | |
| 2009/0059247 A1 * | 3/2009 | Kawasaki | 358/1.8 |

FOREIGN PATENT DOCUMENTS

| | | |
|---|---|---|
| JP | 2001-249583 | 9/2001 |
| JP | 2002-247360 | 8/2002 |
| JP | 2003145827 | 5/2003 |

* cited by examiner

METHOD OF PRE-PROCESSING DATA ON A HOST MACHINE FOR A HOST-BASED PRINT SYSTEM

BACKGROUND

Prior solutions typically use original print data to generate single bit print data on a host machine, e.g. computer. Reducing the print data to a single bit stream enables faster transfer of the data between the host machine and the printing device. While this allows for higher print speeds, there is significant loss of image detail.

To compensate for the loss of image detail, extensive processing is done on the printing device to reconstruct the original image detail using the single bit data stream. This is typically done with extensive hardware circuits and or high-powered processors. These hardware resources add significant cost to the printing device.

FIG. 1 illustrates an overview process flowchart according the prior art described above. On the host machine, an application, e.g. Microsoft PowerPoint, generates page data at a defined pixel rate, e.g. 8 bits per plane per pixel. The image processor renders page data to 1 bit per plane per pixel. While this will allow for faster data transfer to the printer, much of the image detail is lost. The image processed data may be further compressed, e.g. JBIG or JPEG, to facilitate data transfer. The host I/O manages the data to and from the printer.

The printer I/O manages data to and from the host machine. If the received data has been compressed, it will be uncompressed according to the appropriate decompression algorithm. The imaging processing hardware attempts to recreate the details of the original image data using 1 bit per plane per pixel data. A pulse code generator generates pulse codes to control the laser using the modified image data from the image processing hardware. The print engine mechanism uses the pulse codes to print hardcopy image.

FIG. 2 illustrates a functional block diagram of the host machine according to the prior art described in FIG. 1. The application interacts with the operating system (OS) Graphics Interface. A spooler stores data, received via the OS Graphics Interface, in object form. The print processor reads graphics objects stored by the spooler and generates a raster bitmap. The bitmap contains 1-bit per pixel values.

SUMMARY

In the present invention, the processing required to generate high quality print output is shifted from the printing device to the host machine. This allows for minimal hardware resources on the printing device.

In one embodiment, a printing system comprises a host machine and a printing device. The host machine includes an application, image processor, optional controller, and an I/O device. The application generates page data. An image processor receives the page data and renders interim data that contains a multi-bit value per plane per pixel. The interim data may be optionally compressed. I/O device transfers the data to the printing device. The printing device includes an I/O device, an optional controller, a pulse code generator, and a print engine mechanism. The I/O device receives data from the host machine. The controller decompresses the data, if compressed. The pulse code generator, receives the interim data, for each multi-bit value, then generates a pulse code corresponding to the multi-bit value. The print engine receives the pulse codes and transforms the pulse code to a hardcopy image.

DETAILED DESCRIPTION

The interim data accurately represents the original print data without losing necessary detail while significantly reducing the overall size of the print data. The interim, multi-bit values are generated in a way that allows the printing device to easily convert them into high quality print output.

In operation, the software on the host machine examines a pixel, either alone or in relation to adjacent pixels. Based on the image data contained in the pixel or group of pixels, a multi-bit value is generated that can be used by the printing device to easily reproduce the necessary detail of the original pixel. The multi-bit value also contains print engine control parameters that effect print quality enhancements such as toner miser mode, toner explosion, edge roll off, etc. The multi-bit value can be generated algorithmically by using a lookup table or by some combination of these methods.

Figure 1:
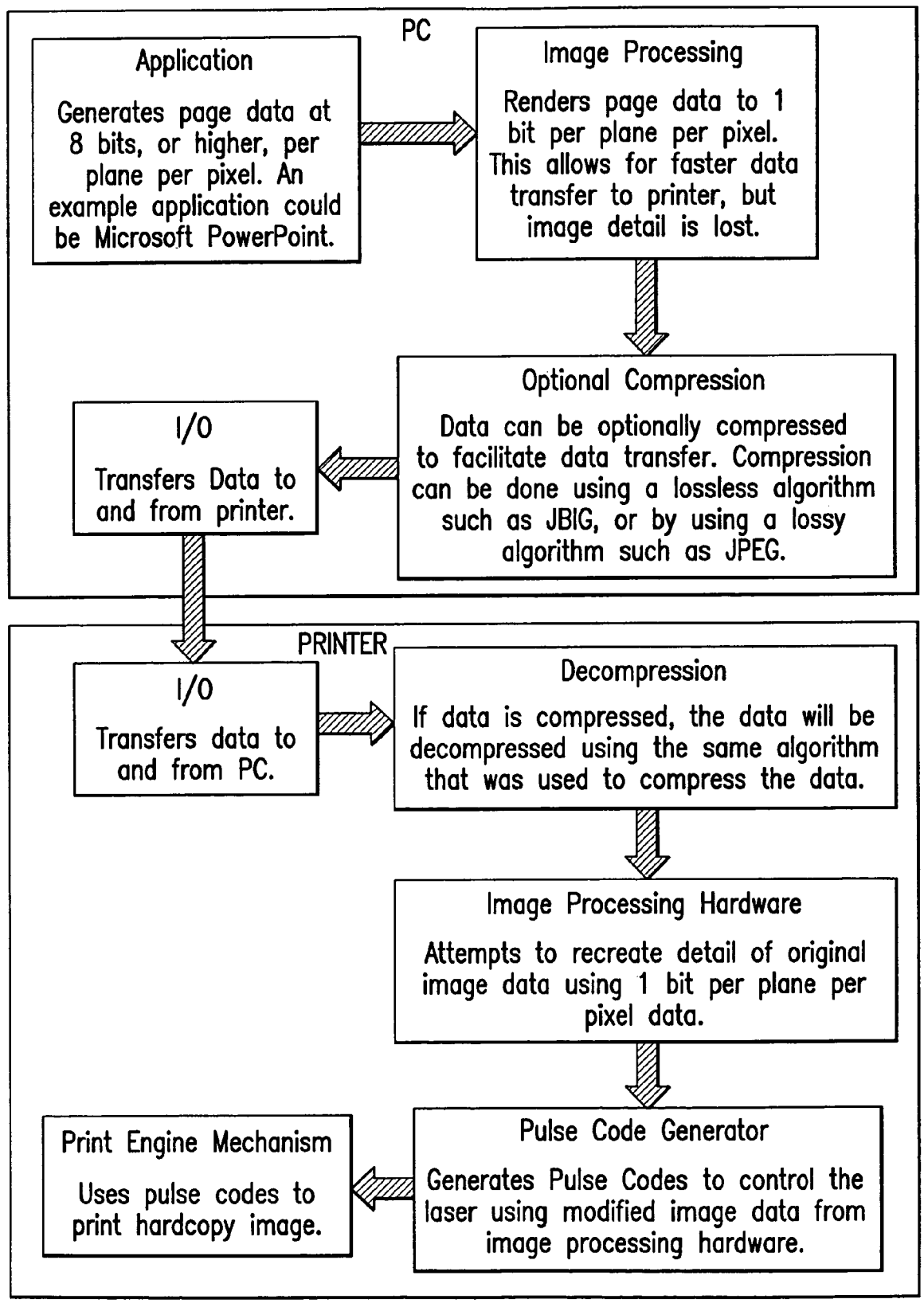
FIG. 1 illustrates an overview process flowchart according to the prior art.
Figure 2:
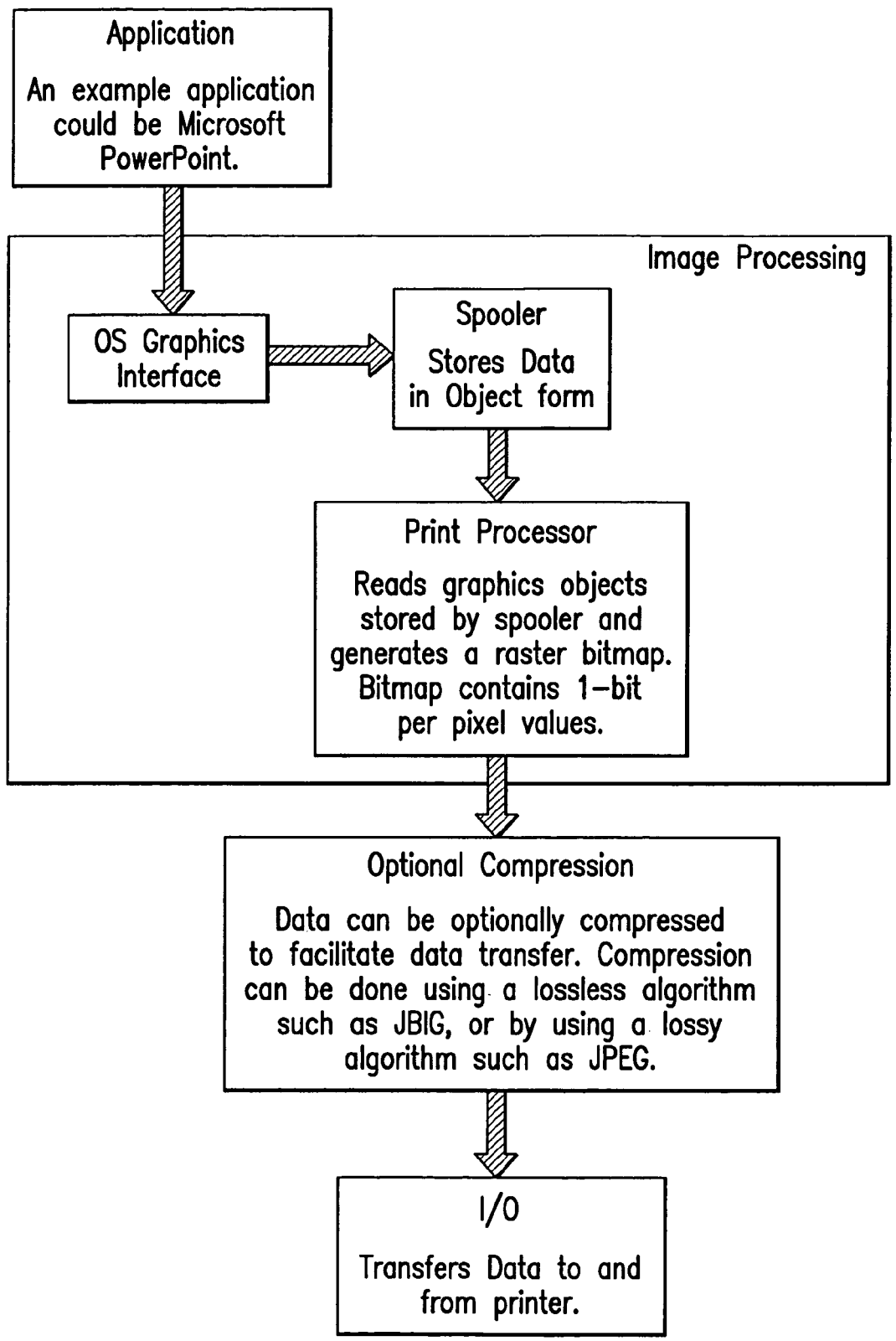
FIG. 2 illustrates a functional block diagram of the host machine according to the prior art described in FIG. 1.
Figure 3:
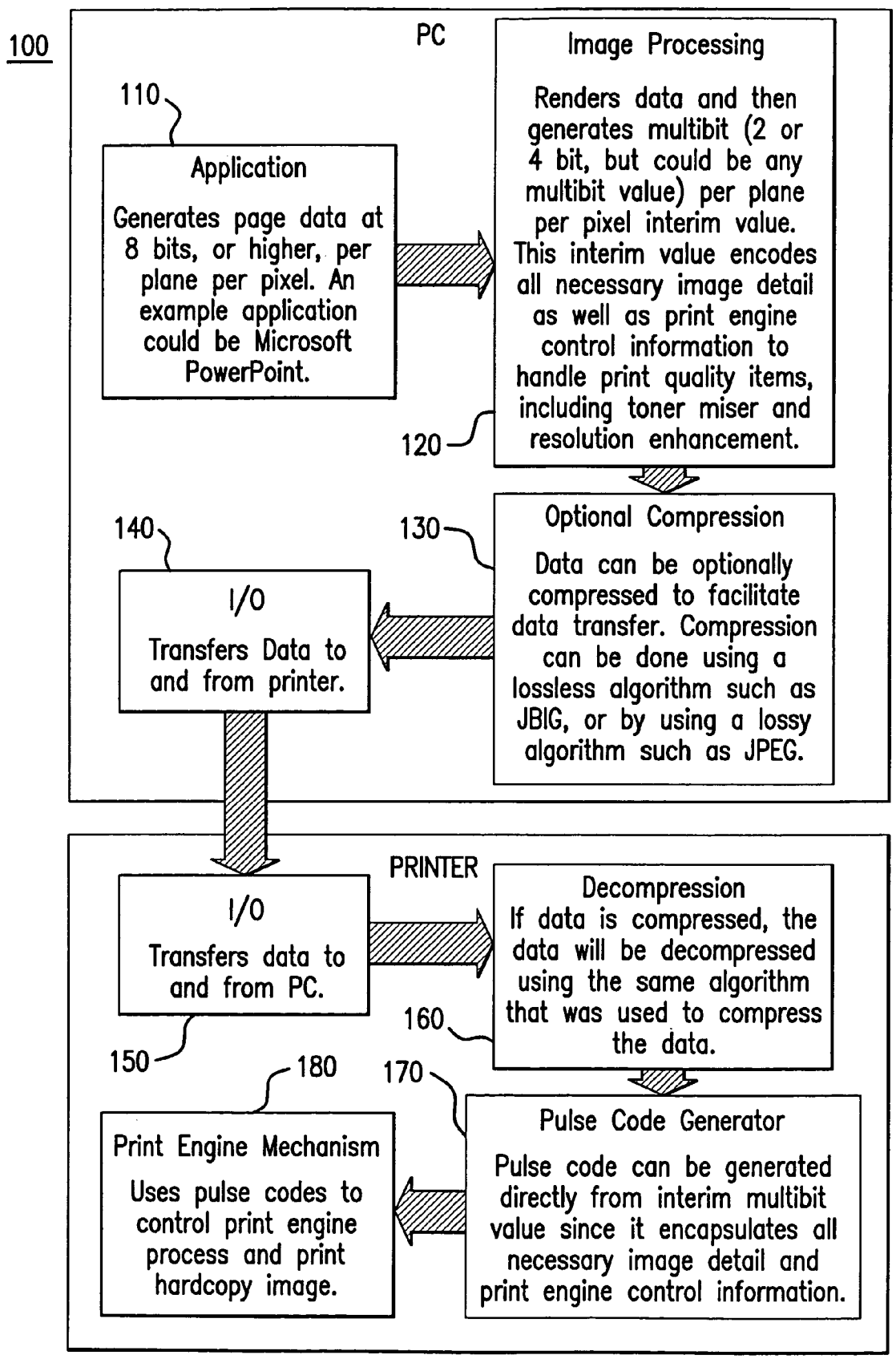
FIG. 3 illustrates an overview process flowchart according to the present invention.

FIG. 3 illustrates a process flowchart 100 according to the present invention.

Steps 110-140 are accomplished on the host machine. In step 110, an application generates page data at a selected bit rate per plane per pixel, e.g. 8 bits. In step 120, the imaging processor renders data to a multi-bit per plane per pixel interim value. This interim value contains all necessary image detail as well as print engine control parameters to handle print quality items, e.g. toner miser and resolution enhancement. In step 130, the data is optionally compressed to facilitate data transfer. Compression can be done using a lossless algorithm, e.g. JBIG, or by using a lossy algorithm, e.g. JPEG. In step 140, the interim data is transferred to and from the printing device.

Steps 150-180 are accomplished on the printing device. In step 150, data is transferred to and from the host machine. In step 160, if the data has been compressed, the data will be decompressed using the same algorithm that was used to compress the data. In step 170, the pulse codes are generated from the interim multi-bit values since it contains all necessary image detail and print engine control parameters. In step 180, the pulse codes are used to print a hardcopy image.

Figure 4:
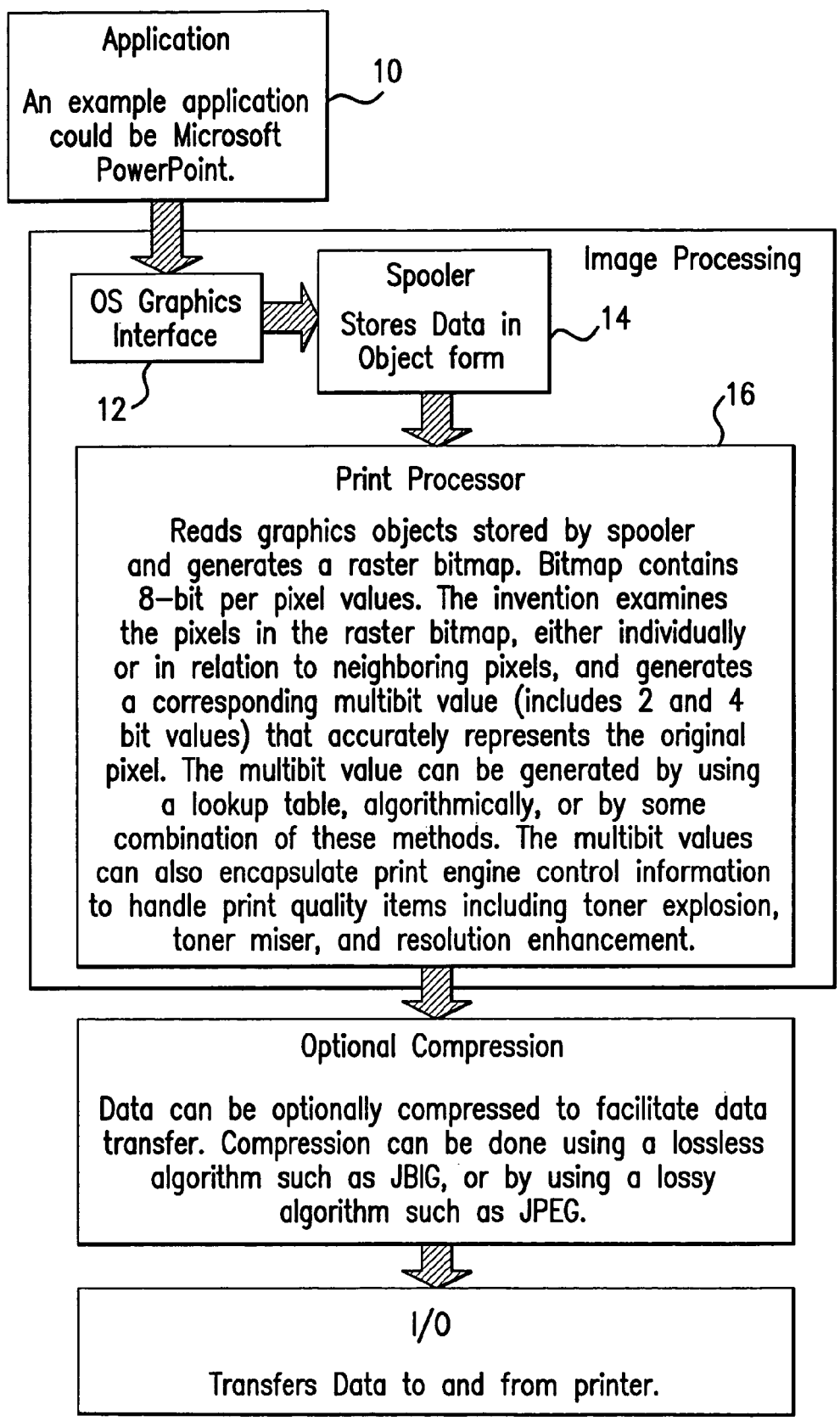
FIG. 4 illustrates a functional block diagram of the host machine according to the flowchart described in FIG. 3.

FIG. 4 illustrates a functional block diagram of the host machine according to the invention described in FIG. 3. The application 10 interacts with the operating system (OS) Graphics Interface 12. A spooler 14 stores data, received via the OS Graphics Interface 12, in object form. The print processor 16 reads graphics objects stored by the spooler 14 and generates a raster bitmap. The bitmap contains 8-bit per pixel values. Any print processor that generates an 8-bit per pixel values maybe used, e.g. that offered by Microsoft or Hewlett-Packard.

In the present invention, the print processor 16 examines the pixels in the raster bitmap, either individually or in relation to neighboring pixels. After this analysis, a corresponding multi-bit value (includes 2 and 4 bit values) that accurately represents the original pixel is generated. The multi-bit value may be generated using a look-up table or algorithmically. The multi-bit values can also encapsulate print engine control information to handle print quality items including toner explosion, toner miser, and resolution enhancement.

The pulse codes are coded data used to instruct the Pulse Width Modulator (PWM) block on what to do for a single pixel. Pulse codes can contain pulse position information (i.e. left, right, center, split) and pulse width information (i.e. make the pulse 15/32 of a pixel wide).

Toner Explosion is a problem with certain patterns of toner on certain types of media under certain ambient conditions that causes some of the toner to relocate on the page—the page ends up looking like tiny explosives were set off under the toner.

Toner Miser allows the reduction of the amount of toner used to render the image on a page. This is usually associated with a 'draft' mode and the image quality is usually less than that of a normally printed page.

In Resolution Enhancement, the apparent resolution of the output image is increased. It also reduces the 'jagged' edges caused by converting an image to a discrete pattern of 1's and 0's. Resolution enhancement is also used to reduce the stair step edges in slanted lines and also smooth out curved edges.

The invention claimed is:

1. A printing method, comprising:
generating page data having a first number of bits per plane per pixel from a first application running on a host machine;
examining the page data by use of a second application running on the host machine;
rendering, by the host machine, interim data that combines printer ready data with print engine control commands, wherein the print engine control commands include at least one of a command to control a print engine in a toner miser mode, a command to control a print engine to perform toner explosion correction, and a command to control resolution enhancement, and wherein the interim data has a second number of bits per plane per pixel that is lower than the first number of bits and higher than one bit per plane per pixel;
transferring the interim data to a printing device;
generating, within the printing device, pulse codes from the interim data; and
rendering a hardcopy image from the pulse codes.

2. The printing method of claim 1, further comprising:
displaying the page data having the first number of bits on a display of the host machine.

3. The printing method of claim 1, wherein the print engine control command to control resolution enhancement is operable to control a print engine to reduce edges.

4. The printing method of claim 1, wherein the interim data contains all information necessary for the printing device to produce the hardcopy image with the same detail contained in the page data.

5. A printing system including a host machine and a printing device, the printing system comprising:
a first software application on the host machine configured to generate page data having a first number of bits per plane per pixel;
a second software application on the host machine configured to examine the page data;
a print data processor in the host machine configured to render interim data that combines printer ready data with print engine control commands, wherein the print engine control commands include at least one of a command to control a print engine in a toner miser mode, a command to control a print engine to perform toner explosion correction, and a command to control resolution enhancement, and wherein the interim data has a second number of bits per plane per pixel that is lower than the first number of bits and higher than one bit per plane per pixel;
a first communication device in the host machine configured to transfer the interim data;
a second communication device in the printing device configured to receive the interim data;
a pulse code generator in the printing device configured to receive the interim data and configured to generate a pulse code corresponding to the interim data; and
a print engine configured to receive the pulse code and transform the pulse code to a hardcopy image.

6. The printing system of claim 5, wherein the print data processor is configured to utilize a lookup table to generate the interim data.

7. The printing system of claim 5, wherein the host machine is a personal computer configured to display the page data having the first number of bits.

8. The printing system of claim 5, wherein the print engine control command to control resolution enhancement is operable to control the print engine to reduce edges.

9. The printing system of claim 5, wherein the interim data contains all information necessary for the printing device to produce the hardcopy image with the same detail contained in the page data.

10. A printing method using a host machine utilizing at least one processor, and a printing device, the printing method comprising:
generating page data having a first number of bits per plane per pixel from a first application running on a host machine utilizing the at least one processor;
examining the page data by use of a second application running on the host machine utilizing the at least one processor;
rendering, by the host machine utilizing the at least one processor, interim data that combines printer ready data with print engine control commands, wherein the print engine control commands include at least one of a command to control a print engine in a toner miser mode, a command to control a print engine to perform toner explosion correction, and a command to control resolution enhancement, and wherein the interim data has a second number of bits per plane per pixel that is lower than the first number of bits and higher than one bit per plane per pixel;
compressing, using a compression algorithm, the interim data in the host machine utilizing the at least one processor; and
transferring the compressed interim data to a printing device.

11. The printing method of claim 10, wherein the print engine control command to control resolution enhancement is operable to control a print engine to reduce edges.

12. The printing method of claim 10, further comprising:
decompressing the compressed interim data in the printing device;
generating, within the printing device, pulse codes from the decompressed interim data; and
rendering a hardcopy image from the pulse codes.

13. The printing method of claim 12, wherein the compression algorithm comprises JBIG.

14. The printing method of claim 12, wherein the compression algorithm comprises JPEG.

15. The printing method of claim 10,
  decompressing, using the compression algorithm, the compressed interim data in the printing device;
  wherein the host device includes image processing and the printing device does not include image processing.

16. The printing method of claim 10, wherein the pulse code contains pulse width information and pulse position information, wherein the pulse position information is selected from the group consisting of left-justified, right-justified, center-justified, and split-justified.

* * * * *